US008284420B2

(12) United States Patent
Sano

(10) Patent No.: US 8,284,420 B2
(45) Date of Patent: Oct. 9, 2012

(54) HEATING DEVICE FOR SUPPLYING POWER TO PLURAL HEAT SOURCES, HEATING METHOD AND IMAGE FORMING APPARATUS USING THE HEATING DEVICE

(75) Inventor: Takeshi Sano, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 12/656,405

(22) Filed: Jan. 28, 2010

(65) Prior Publication Data

US 2010/0238466 A1 Sep. 23, 2010

(30) Foreign Application Priority Data

Mar. 17, 2009 (JP) ................................ 2009-064554

(51) Int. Cl.
*G06K 15/00* (2006.01)

(52) U.S. Cl. ...... 358/1.14; 358/1.9; 358/1.13; 358/1.15; 399/33; 399/67; 399/68; 399/69; 399/70

(58) Field of Classification Search ........................ None
See application file for complete search history.

(56) References Cited

U.S. PATENT DOCUMENTS

| | | | | |
|---|---|---|---|---|
| 5,408,301 | A * | 4/1995 | Tokishige et al. | 399/69 |
| 5,819,134 | A * | 10/1998 | Sato et al. | 399/69 |
| 6,301,454 | B1 | 10/2001 | Nishida et al. | |
| 6,603,936 | B2 * | 8/2003 | Murata et al. | 399/69 |
| 6,807,386 | B2 | 10/2004 | Yasui et al. | |
| 7,110,690 | B2 * | 9/2006 | Matsumoto | 399/69 |
| 7,130,553 | B2 * | 10/2006 | Sakai | 399/68 |
| 7,327,964 | B2 * | 2/2008 | Funabiki et al. | 399/45 |
| 7,783,219 | B2 * | 8/2010 | Maeda | 399/69 |
| 7,860,419 | B2 * | 12/2010 | Tateishi et al. | 399/70 |
| 7,945,181 | B2 * | 5/2011 | Okada | 399/69 |
| 8,010,007 | B2 * | 8/2011 | Sano et al. | 399/69 |
| 2004/0131374 | A1 * | 7/2004 | Sakai | 399/68 |

FOREIGN PATENT DOCUMENTS

| | | |
|---|---|---|
| JP | 09-305059 | 11/1997 |
| JP | 11-039255 | 2/1999 |

OTHER PUBLICATIONS

Office Action dated Nov. 9, 2010 issued in co-pending U.S. Appl. No. 12/232,147.

* cited by examiner

*Primary Examiner* — Dung Tran
(74) *Attorney, Agent, or Firm* — Harness, Dickey & Pierce, P.L.C.

(57) ABSTRACT

The heating device includes plural heaters to heat fixing members; a power supplying device to supply power to the plural heaters; and a controller. The controller determines heater activation priority order for the heaters every control cycle, and allows the power supplying device to supply power to one of the heaters according to the heater activation priority order. When the controller judges that it is necessary to activate two or more of the heaters in a control cycle, the controller allows the power supplying device to supply power to one of the heaters having the highest rank in the heater activation priority order among the two or more of the heaters. The controller changes the heater activation priority order by according the lowest rank to the heater activated in the last control cycle while maintaining the rank relationship among the others of the heaters.

9 Claims, 7 Drawing Sheets

HEATING DEVICE FOR SUPPLYING POWER TO PLURAL HEAT SOURCES, HEATING METHOD AND IMAGE FORMING APPARATUS USING THE HEATING DEVICE

BACKGROUND OF THE INVENTION

1. Field of the Invention

The present invention relates to a heating device and a heating method. In addition, the present invention relates to an image forming apparatus using the heating device.

2. Discussion of the Related Art

Heating devices have been used for fixing devices of electrophotographic image forming apparatus such as copiers, printers, facsimiles and multifunctional image forming apparatus having copying, printing and facsimileing functions. Recently, such fixing devices use plural heaters or a heater having a relatively large capacity to rapidly raise the temperature of the heating members such as heat rollers.

Particularly, the heating capacity is greater in high speed image forming apparatus than that in medium speed image forming apparatus, and therefore the incoming current seriously increases in such high sped image forming apparatus when the heater achieves a lighting state (i.e., activated state), resulting in occurrence of large voltage variation in the image forming apparatus. Such voltage variation causes a flickering problem in that lamps set in a room flicker when such a high speed image forming apparatus is also set in the room, thereby making the persons working in the room uncomfortable.

In attempting to avoid the voltage variation causing the flickering problem, image forming apparatus using a controlling method (hereinafter referred to as a soft start controlling method) such that power application is gradually performed on the heater using phase controlling instead of full power application to control the incoming current are provided.

However, even when such a soft start controlling method is used, the incoming current seriously increases, resulting in occurrence of great voltage variation, if the plural heaters of the fixing device of the image forming apparatus are activated at the same time. In addition, by performing such phase controlling, a harmonic component is generated in the supply current. Therefore, when plural heaters are activated at the same time, a strong harmonic current is caused. In this case, problems in that the condenser of a power company is excessively heated and/or the breaker of the power company causes an error tend to be caused.

In attempting to solve the problems, a published unexamined Japanese patent application No. (hereinafter referred to as JP-A) 09-305059 discloses an image forming apparatus having a fixing device in which plural heaters are subjected to ON/OFF controlling at the respective control cycles such that the control cycles thereof are differentiated by a predetermined cycle in such a manner that the plural heaters do not achieve the OFF state at the same time, and in addition the OFF timing of the plural heaters is subjected to variable control depending on the detected temperature of the image forming apparatus within a range of half the control cycles so that the control cycles of the heaters are not overlapped.

However, in the image forming apparatus disclosed in JP-A 09-305059, there is a case where plural heaters achieve an activated state at the same time. As a result, a strong harmonic current is caused, resulting in occurrence of the problems in that the condenser of a power company is excessively heated and/or the breaker of the power company causes an error.

Because of these reasons, a need exists for a heating device in which plural heaters are subjected to heating control with hardly causing the great voltage variation and strong harmonic current problems.

SUMMARY OF THE INVENTION

As an aspect of the present invention, a heating device is provided. The heating device includes:

plural heat sources configured to heat one or more members;

a power supplying device configured to supply a power to each of the plural heat sources; and a controller configured to determine a fixed first priority order for the plural heat sources while determining a second priority order for the plural heat sources every predetermined control cycle on the basis of the fixed first priority order and to control the power supplying device to supply a power to one of the plural heat sources according to the second priority order.

When the controller judges that it is necessary to activate only one of the plural heat sources in a control cycle, the controller allows the power supplying device to supply a power to the one of the plural heat sources in the control cycle. When the controller judges that it is necessary to activate the plural heat sources in a control cycle, the controller allows the power supplying device to supply a power to one of the plural heat sources, which has the highest rank in the second priority order among the two or more of the plural heat sources, in the control cycle.

The controller changes the second priority order by according the lowest rank to the one of the heat sources activated in a last control cycle while maintaining rank relationship among the others of the plural heat sources in the last second priority order.

As another aspect of the present invention, an image forming apparatus is provided. The image forming apparatus includes:

an image forming section configured to form a toner image on a recording medium; and a fixing device having one or more fixing members configured to fix the toner image on the recording medium, wherein the one or more fixing members are heated by the heating device mentioned above.

As a yet another aspect of the present invention, a heating method for supplying a power to each of plural heat sources is provided. The heating method includes:

determining a second priority order for the plural heat sources every control cycle on the basis of a fixed first priority order;

judging whether it is necessary to activate one or more of the plural heat sources in a control cycle on the basis of conditions of the fixing members;

when it is judged that it is necessary to activate only one of the plural heat sources, supplying a power to the one of the plural heat sources in the control cycle;

when it is judged that it is necessary to activate two or more of the plural heat sources, supplying a power to one of the plural heat sources having the highest rank in the second priority order among the two or more of the plural heat sources in the control cycle; and changing the second priority order by according the lowest rank to the one of the heat sources activated in the last control cycle while maintaining the rank relationship among the others of the plural heat sources in the last heater activation priority order.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

At first, the heating device and image forming apparatus of the present invention will be explained by reference to drawings.

Figure 2:
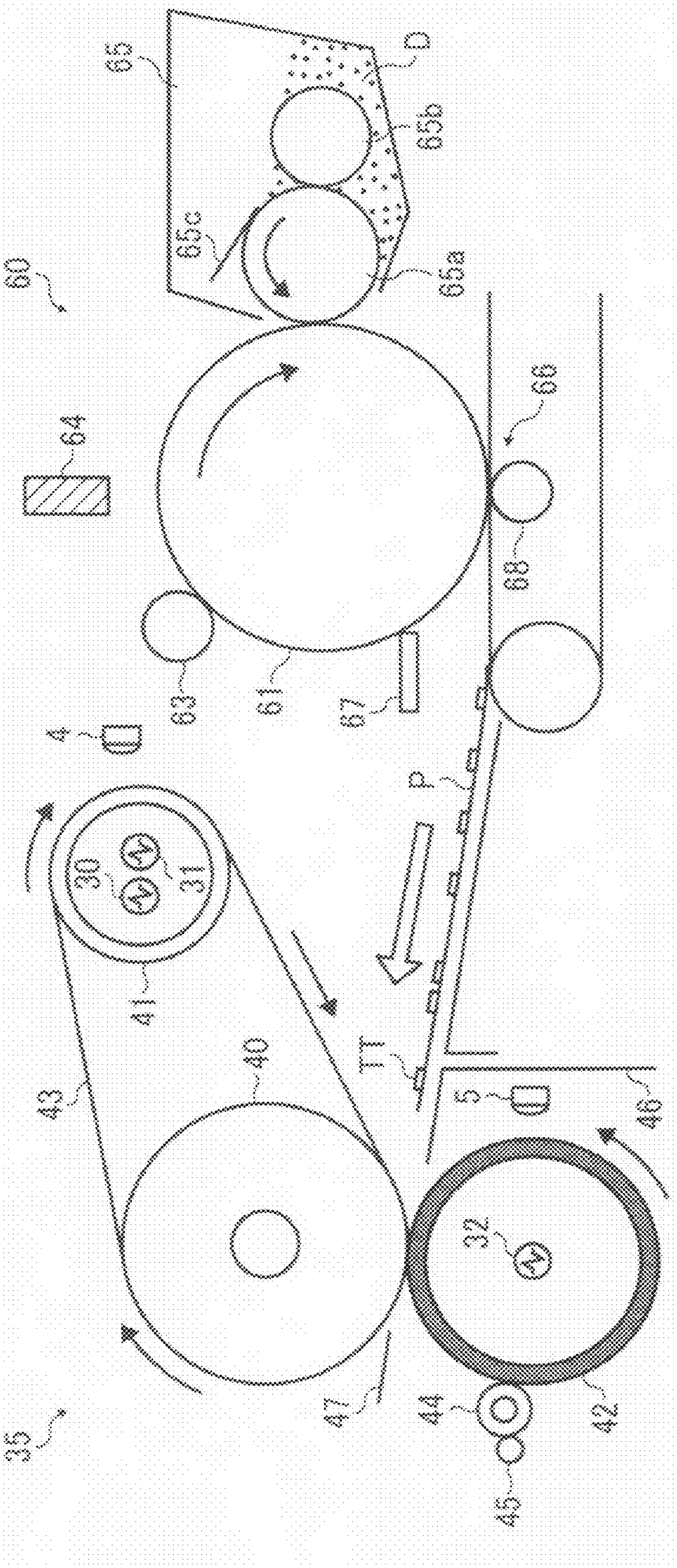
FIG. 2 is a schematic diagram illustrating an example of the image forming apparatus of the present invention.

FIG. 2 is a schematic view illustrating an example of the image forming apparatus of the present invention.

The image forming apparatus includes an image forming section 60 configured to form a toner image TT on a recording medium P, and a fixing device 35 configured to fix the toner image TT on the recording medium P.

The image forming section 60 includes a photoreceptor 61 rotated in a direction indicated by an arrow; a charging device 63 configured to charge the photoreceptor 61; a light irradiating device 64 configured to irradiate the charged photoreceptor 61 according to image data to form an electrostatic latent image on the photoreceptor; a developing device 65 having a developing roller 65*a* rotated in a direction indicated by an arrow and configured to develop the electrostatic latent image with a developer D including a toner to form a toner image on the photoreceptor 61; a transfer device 66 having a transfer roller 68 configured to transfer the toner image onto the recording medium P; and a cleaning device 67 configured to remove toner particles remaining on the surface of the photoreceptor 61 after transferring the toner image.

In this example, the charging device 63 is a contact or short-range charger having a charging roller charging the photoreceptor 61 so that the photoreceptor has a negative charge. Specifically, the charging roller, to which a negative DC bias is applied, is contacted with the photoreceptor 61 or is set so as to be close to the photoreceptor so that the photoreceptor is charged and has a surface potential of about −500V.

Instead of a DC bias, a DC voltage on which an AC voltage is superimposed can also be used as the charge bias. In addition, the charging device 63 can include a cleaning brush configured to clean the surface of the charging roller. Further, a thin film may be wound on each end portion of the charging roller, and the wound film portions of the charging roller are contacted with the surface of the photoreceptor 61 so that the charging roller serves as a short-range charging roller. In this case, electric discharge is caused in the gap between the surface of the charging roller and the surface of the photoreceptor 61, resulting in charging of the photoreceptor.

The thus charged photoreceptor 61 is exposed to a light beam, which is emitted by the light irradiating device 64 and which is modulated to include image data, resulting in formation of an electrostatic latent image on the photoreceptor. Specific examples of the light irradiating device include devices using laser, combinations of a LED array and a focusing device, etc.

The electrostatic latent image thus formed on the photoreceptor 61 is developed with the developer D including a toner. The developer D in a developer containing portion of the developing device 65 is fed to the developing roller 65*a* by a developer supplying roller 65*b* while agitated thereby. In this regard, the developing roller 65*a* and developer supplying roller 65*b* move in the opposite directions at the nip therebetween. In addition, the developer fed to the developing roller 65*a* is layered by a developer layer thickness controlling blade 65*c*, which is set so as to be contacted with the surface of the developing roller 65*a*. Thus, the toner in the developer D is rubbed at the nip between the rollers 65*a* and 65*b* and the nip between the roller 65*a* and the blade 65*c*, and thereby the toner is charged to have a proper amount of charge.

The toner image formed on the photoreceptor 61 is then transferred onto the recording medium P by the transfer device 66. In this example, the toner image is directly transferred onto the recording medium, but the toner image may be indirectly transferred to the recording medium via an intermediate transfer medium.

The recording medium P bearing the toner image TT thereon is fed to the fixing device 35.

The fixing device 35 is a belt fixing device, and includes a fixing roller 40, a heat roller 41 serving as a heating member, a pressure roller 42, a fixing belt 43 serving as a fixing member, a guide plate 46 also serving as a fixing member, a separation plate 47, an oil application roller 44, a cleaning roller 45, and first and second temperature detection sensors 4 and 5.

The fixing belt 43 is tightly stretched by the fixing roller 40 and the heat roller 41. Since the fixing roller 40 is driven by a driving source (not shown), the fixing belt 43 is rotated in a direction indicated by an arrow in FIG. 2. The pressure roller 42 presses the fixing belt 43 toward the fixing roller 40.

Since the fixing belt 43 is rotated while driven by the fixing roller 40 and contacted with the heat roller 41, the entire of the fixing belt 43 is heated by the heat roller, which is heated by a first heater 30 and a second heater 31.

The pressure roller 42 has a cover layer, which is made of a heat resistant elastic material including a synthetic rubber, on the circumferential surface thereof. In addition, the pressure roller 42 has therein a third heater 32 configured to heat the pressure roller.

The recording medium P bearing the toner image TT thereon, which is fed while guided by the guide plate 46, is further fed while nipped by the fixing belt 43 and the pressure roller 42, and the fixing belt applies heat and pressure to the recording medium while feeding the recording medium, resulting in fixation of the toner image TT on the recording medium.

At a location near the end of the fixing belt 43 in the feeding direction, the separation plate 47 separates the recording medium P from the fixing belt 43.

The first temperature detection sensor 4 detects the temperature of the circumferential surface of the heat roller 41, and the second temperature detection sensor 5 detects the temperature of the circumferential surface of the pressure roller 42. As explained below, a controller of the image forming apparatus controls activation of first, second and third heaters 30, 31 and 33 on the basis of the temperatures detected by the first and second temperature detection sensors 4 and 5.

The oil application roller 44 applies an oil on the circumferential surface of the pressure roller 42, and the cleaning roller 45 cleans the surface of the oil application roller 44.

Next, the heating device configured to perform heating for the fixing device 35 will be explained.

Figure 1:
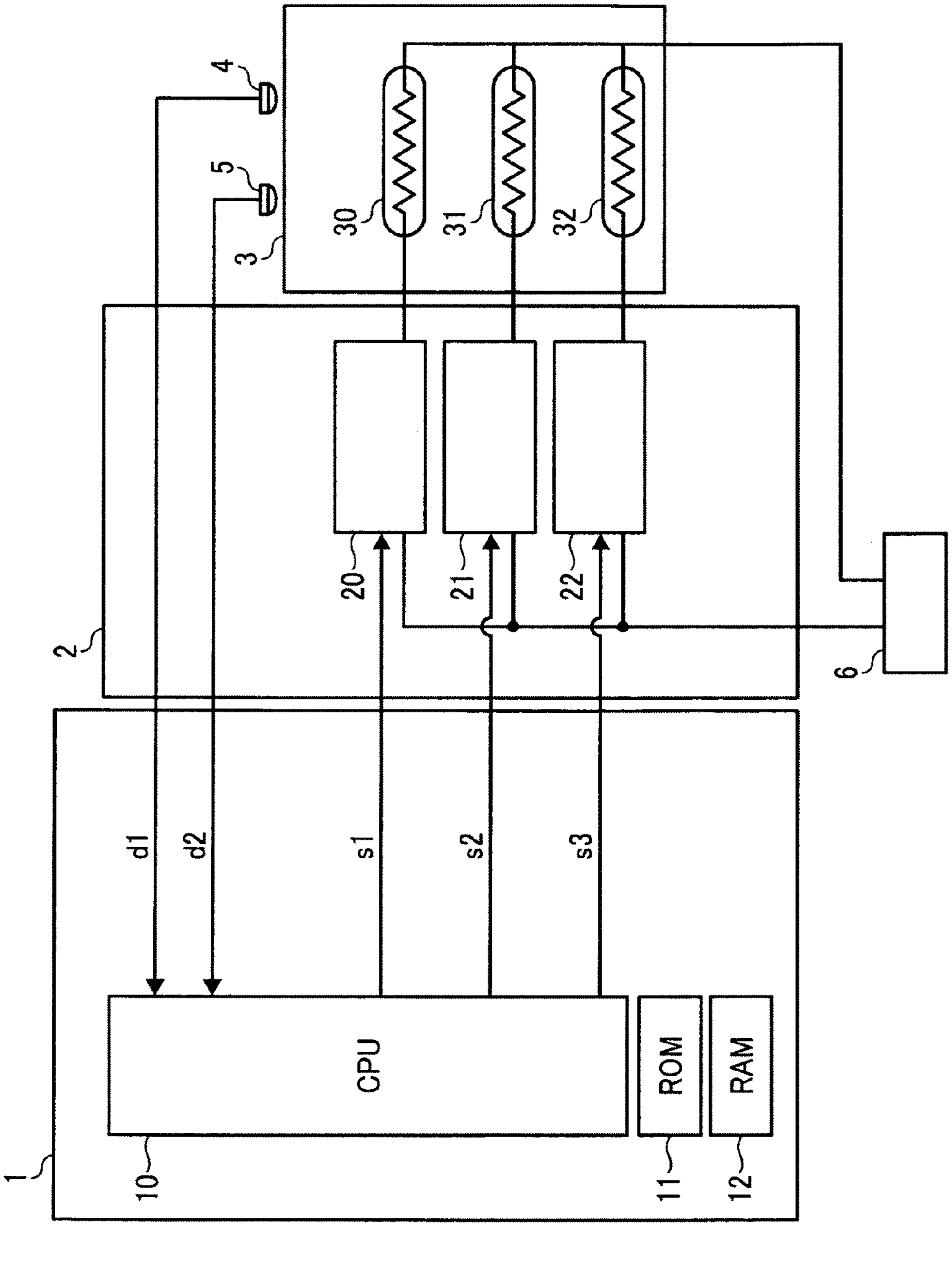
FIG. 1 is a functional block diagram illustrating an example of the heating device of the present invention.

FIG. 1 is a block diagram illustrating the function of the heating device. The heating device includes a controller 1, which controls not only the heating device but also the entire image forming apparatus. In addition, the heating device includes a heater driving device 2, a heater 3, the first and second temperature detection sensors 4 and 5, and a power source 6.

The controller 1 is a micro computer including a CPU 10, a ROM 11, and a RAM 12. The CPU 10 executes the control program stored in the ROM 11 in the RAM 12 serving as a working area to control the entire image forming apparatus. In addition, the CPU 10 issues instructions to the heater driving device 2 depending on the temperatures of the heater 3 detected by the sensors 4 and 5 to control turn-on and turn-off of each of the first, second and third heaters 30, 31 and 32.

The heater driving device 2 is a heat source driving device configured to control application and stopping of an electric power of from the power source 6 to the heater 3 according to the instructions of the controller 1. A first heater driver 20 of the heater driving device 2 performs controlling such that when receiving a power-on instruction from the CPU 10 using a first ON/OFF signal s1, the first heater driver 20 Controls the power source 6 to supply a power to the first heater 30, and when receiving a power-off instruction from the CPU 10 using the first ON/OFF signal s1, the first heater driver 20 controls the power source 6 to stop the power to the first heater 30.

Similarly to this controlling operation of the first heater driver 20, second and third heater drivers 21 and 22 respectively perform power-on and power-off controlling on the second and third heaters 31 and 32 according to ON/OFF signals s2 and s3 sent from the CPU 10.

The heater 3 includes the first and second heaters 30 and 31 arranged inside the heat roller 41, and the third heater 32 arranged inside the pressure roller 42. Halogen heaters are preferably used for the first, second and third heaters, but any heaters can be used therefor as long as the heaters can heat the rollers.

The first temperature detection sensor 4 detects the temperature of the surface of the heat roller 41 (i.e., a first detected temperature d1 in FIG. 1), and inputs information on the first detected temperature d1 to the CPU 10. Similarly, the second temperature detection sensor 5 detects the temperature of the surface of the pressure roller 42 (i.e., a second detected temperature d2 in FIG. 1), and inputs information on the second detected temperature d2 to the CPU 10.

The power source 6 is an electric, power supplying device configured to supply electric power to all the parts of the image forming apparatus as well as the first, second and third heaters 30-32 using a commercial power source of an electric power company.

The image forming apparatus further includes other controllers (not shown) such as an operation controller for controlling the operation of an operation panel (not shown), from which users can input instructions to the image forming apparatus and which displays the conditions set for the image forming apparatus for the users; a reading controller for controlling the operation of an image reading device (not shown) configured to optically read an image of a document; an engine controller for controlling the operation of the image forming section (i.e., an engine) configured to perform image forming operations; and a writing controller for controlling the operation of writing an image on the photoreceptor according to image data.

In this image forming apparatus, the CPU 10 watches change of the temperature of the heater 3 on the basis of first and second temperatures d1 and d2 detected by the sensors 4 and 5, respectively. When the detected temperature d1 or d2 is lower than a preset temperature in a predetermined control cycle, the CPU 10 judges that it is necessary to activate one or more of the first to third heaters 30-32, and requests the heater driving device 2 to activate one of the first to third heaters 30-32 in the next control cycle. The heater driving device 2 heats the designated heater 30, 31 or 32 to perform controlling such that the temperature of the fixing belt 43 is sufficient to fix the toner image TT on the recording medium P.

Next, the heater activation controlling operation of the fixing device will be explained.

At first, the heater priority order of the first, second and third heaters 30-32 is preliminarily set. For example, the heater priority order is determined in such a manner that the heater used for heating the portion of the fixing device, the temperature of which portion has to be maintained so as to be not lower than the predetermined temperature, has a higher priority. For example, in the fixing device 35, first, second and third heater priorities are assigned to the first, second and third heaters 30, 31 and 32, respectively. The information on this heater priority order (hereinafter sometimes referred to as a first priority order) is stored in the RAM 12 as nonvolatile information.

Figure 5:
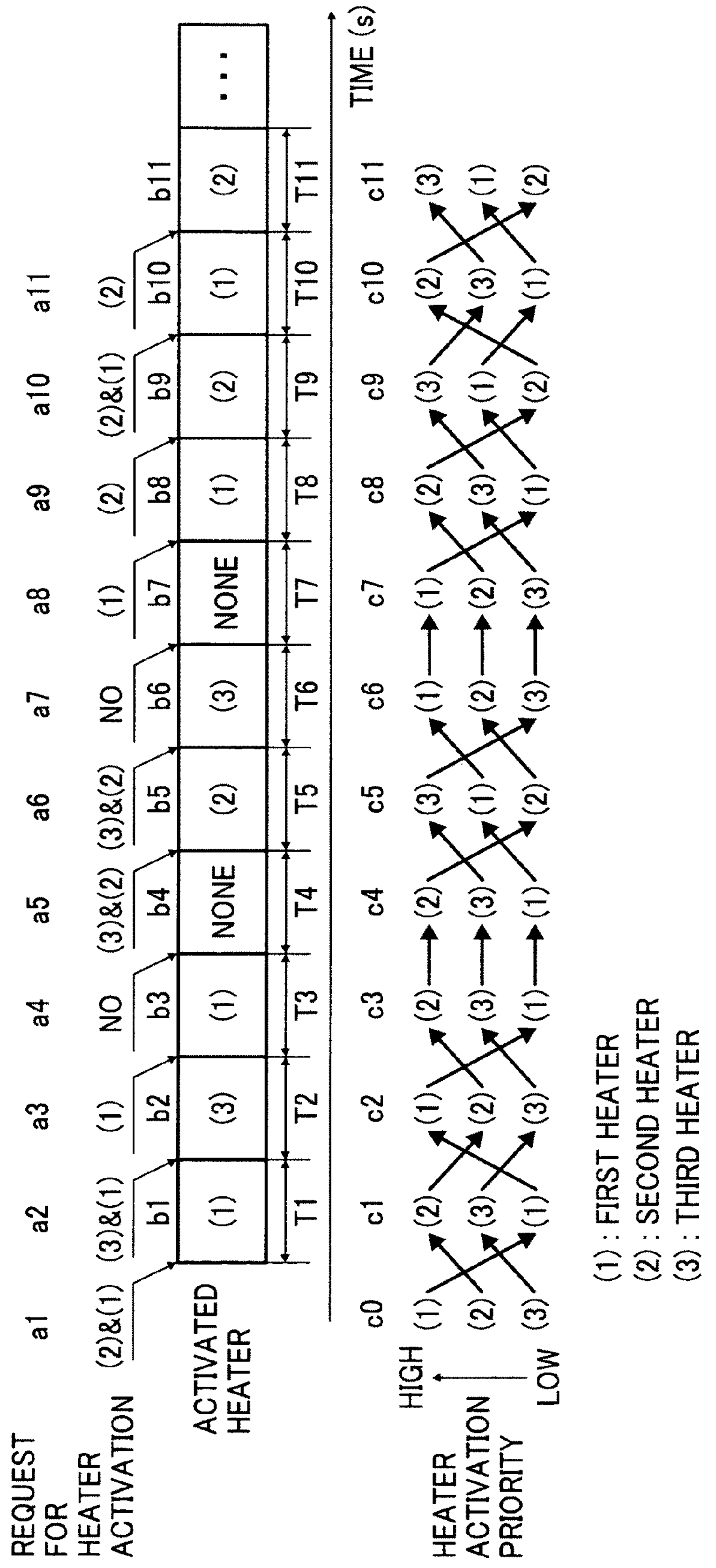
FIG. 5 is a schematic view for explaining an example of the activating heater determination operation performed by the CPU.

In addition, activation of the first to third heaters 30-32 is controlled in a predetermined control cycle T (as illustrated in FIG. 5). In this example, the predetermined control cycle is hereinafter referred to as a heater activation controlling cycle. The heater activation controlling cycle T can be freely set. For example, the heater activation controlling cycle T is set to 1 second. The CPU 10 watches change of the temperature of the heater 3 in one heater activation controlling cycle T (i.e., 1 second) on the basis of the first and second temperatures d1 and d2 detected by the first and second temperature detection sensors 4 and 5, respectively. When one or more of the first and second temperatures d1 and d2 are lower than the preset temperatures, the CPU 10 determines a heater to be activated among the heaters 30-32. If there are plural heaters to be activated, the CPU 10 determines to activate one of the heaters 30-32 on the basis of a heater activation priority order (hereinafter sometimes referred to as a second priority order), which is different from the heater priority order (first priority order) mentioned above and which is changed every one heater activation controlling cycle T while determining the activation rate (i.e., activation duty in one cycle) of the heater to be activated. The CPU 10 then orders the heater driving device 2 to activate the heater thus determined to be activated. Alternatively, it is possible that the activation duty is determined on the basis of the results of temperature detection made at the beginning of the heater activation controlling cycle T.

As mentioned above, the heater activation priority order (second priority order) is set independently of the heater priority order (first priority order). The second priority order is changed in such a manner that the lowest rank is accorded to the heater activated in the last heater activation controlling cycle while maintaining the rank relationship of the other heaters (i.e., according a rank higher by one rank than the former rank to each of the other heaters as illustrated in FIG. 5). Even when the second priority order is changed, the above-mentioned first priority order is not changed.

It is preferable that the second priority order is set so as to be the same as the first priority order in the initial condition setting. Specifically, it is preferable that in the initial condition setting, first, second and third ranks are accorded to the first, second and third heaters 30, 31 and 32 as illustrated in FIG. 5 (c0). In a case where the initial condition setting is not performed, it is preferable to determine the heater to be activated according to the first priority order.

Next, the operation of the CPU 10 to determine the heater to be activated will be explained by reference to FIG. 3.

Figure 3:
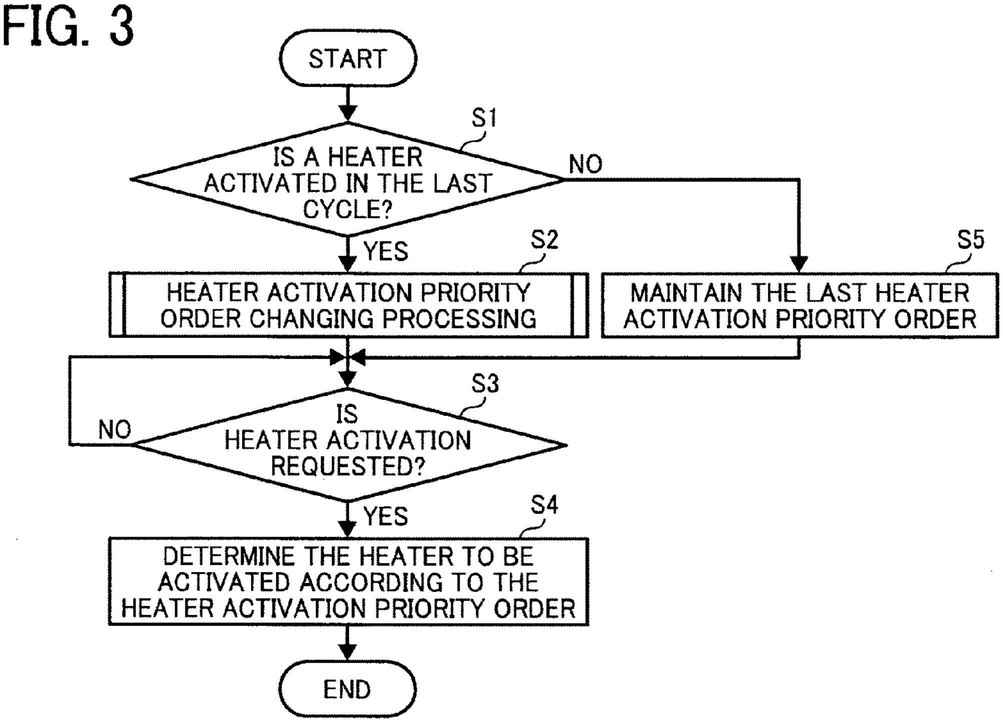
FIG. 3 is a flowchart illustrating the operation of the CPU illustrated in FIG. 1 to determine the heater to be activated.

FIG. 3 is a flowchart illustrating the operation of the CPU 10 to determine the heater to be activated.

In step S1, the CPU 10 determines in a heater activation controlling cycle T whether one of the first, second and third heaters 30-32 is heated in the last heater activation controlling cycle. When the CPU 10 determines that one of the heaters is activated (i.e., YES in S1), the heater activation priority order (second priority order) is changed in step S2. In step S3, the CPU 10 judges whether there is a heater activation request. In this regard, the CPU 10 judges that there is a heater activation request when one or more of the detected temperatures d1 and d2 are lower than the predetermined temperatures in a heater activation controlling cycle T. When the CPU 10 judges that there is a heater activation request (YES in step S3), the CPU determines the heater to be activated on the basis of the heater activation priority order (second priority order), resulting in completion of this operation.

Next, the operation of changing the heater activation priority order (second priority order) will be explained by reference to FIG. 4.

Figure 4:
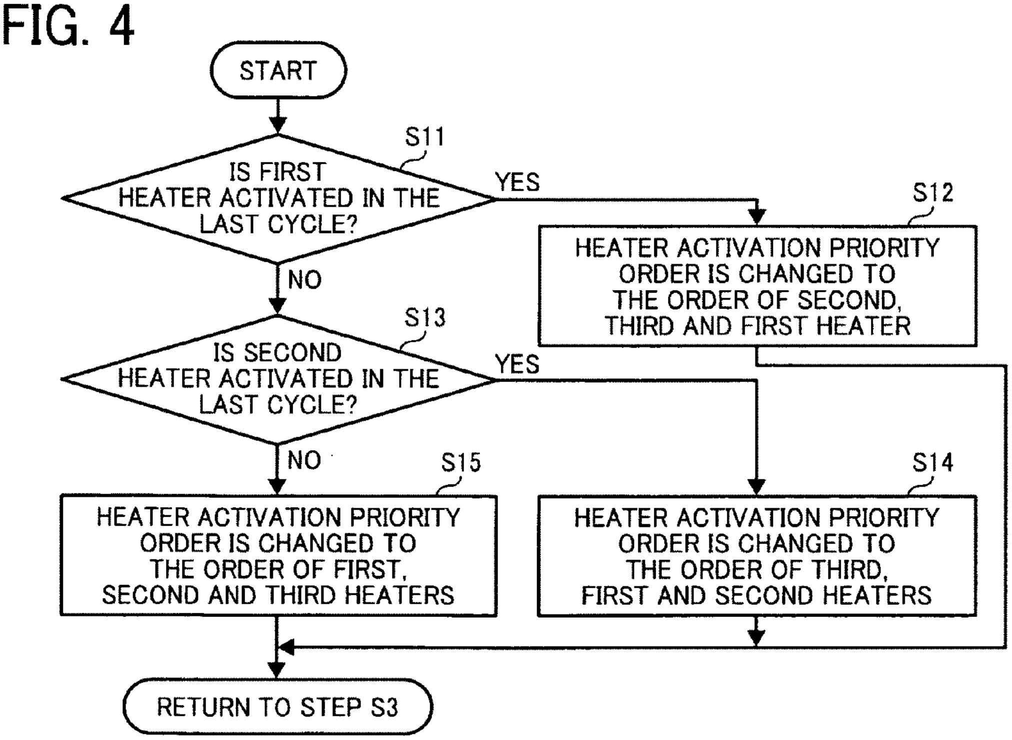
FIG. 4 is a flowchart illustrating the heater activation priority order changing operation in the activating heater determination operation illustrated in FIG. 3.

FIG. 4 is a flowchart illustrating the operation of the CPU 10 to change the heater activation priority order.

In step S11 of the heater activation priority order changing operation, the CPU 10 judges whether the first heater is activated in the last heater activation controlling cycle. When the first heater is activated in the last heater activation controlling cycle (YES in step S11), the heater activation priority order is changed such that the second heater attains the first rank, the third heater attains the second rank and the first heater attains the third rank (step S12), and then the operation returns to execute step S3. When the first heater is not activated (NO in step S11) and the heater activated in the last heater activation controlling cycle is not the second heater (NO in step S13), the heater activation priority order is changed such that the first heater attains the first rank, the second heater attains the second rank and the third heater attains the third rank (step S15), and then the operation returns to execute step S3.

The CPU 10 determines the heater to be activated in the following heater activation controlling cycle according to this heater activation priority order.

Thus, the CPU 10 determines the heater used for the last heater activation controlling cycle every heater activation controlling cycle, and then changes the heater activation priority order on the basis of the results by changing the ranks of the heaters in the heater activation priority order (second priority order), so that the same heater is not continuously heated.

Although it is not illustrated in FIG. 4, when no heater is activated in the last heater activation controlling cycle, the CPU 10 maintains the last heater activation priority order (second priority order).

Next, an example of the heater activation method used for the image forming apparatus of the present invention will be explained by reference to drawings.

FIG. 5 is a schematic diagram for explaining a specific example of the heater activation operation of the CPU 10 illustrated in FIG. 1.

In FIG. 5, heater activation requests are described in columns a1 to a11. Specifically, the numbers ((1), (2) and (3)) of one or more of the first to third heaters 30-32 requested to be activated in one heater activation controlling cycle T (T1 to T11) are described in the columns a1 to a11. In this regard, there are three cases where plural heaters are requested to be activated; only one heater is requested to be activated; and no heater is requested to be activated. As illustrated in FIG. 5, numerals (1), (2) and (3) respectively denote the first, second and third heaters 30, 31 and 32.

In addition, the number ((1), (2) or (3)) of the heater actually heated in each of the heater activation controlling cycles T (T1 to T11) is described in columns b1 to b11. In this regard, a case where no heater is activated is represented by "NONE".

As mentioned above, character T (T1 to T11) denotes the heater activation controlling cycle.

The combinations of the numbers ((1), (2) and (3)) of the first to third heaters 30-32 described in each of columns c0 to c11 represent the heater activation priority order (second priority order). In this regard, in each of the columns c0 to c11, a heater having a higher position has a higher rank. Specifically, in the column c0, a first rank (a highest rank) is accorded to the first heater 30, a second rank is accorded to the second heater 31, and a third rank (a lowest rank) is accorded to the third heater 32. In the column c, change in rank is represented by arrows. When the image forming apparatus is turned on, or the image forming operation mode is changed, the heater activation priority order is set according to the heater priority order (first priority order) (i.e., the first order of (1), (2) and (3) illustrated in column c0).

When the CPU 10 determines (in a1) that the first and second heaters are requested to activate before a heater activation controlling cycle T1, the CPU determines (in b1) to activate the first heater between the first and second heaters in the first heater activation controlling cycle T1 according to the heater activation priority order (described in c0), and then changes the heater activation priority order as illustrated in c1 (i.e., the order of (2), (3) and (1)). In this case, the rank of the first heater is changed from the first rank to the third rank (i.e., the lowest rank). The rank of the second heater is changed from the second rank to the first rank (i.e., the highest rank), and the rank of the third heater is changed from the third rank to the second rank. Thus, the second and third heaters are promoted to the ranks higher by one rank than the former ranks, namely, the rank relationship between the heaters other than the activated heater is maintained.

Next, when the CPU 10 determines (in a2) that the first and third heaters are requested to activate in a heater activation controlling cycle T1, the CPU determines (in b2) to activate the third heater between the first and third heaters in the second heater activation controlling cycle T2 according to the heater activation priority order (described in c1), and then changes the heater activation priority order to the order described in c2. In this case, the rank of the third heater, which is activated in the heater activation controlling cycle T2, is changed from the second rank to the third rank (lowest rank).

In addition, the rank of the first heater is changed from the third rank to the first rank (highest rank), and the rank of the second heater is changed from the first rank to the second rank. Thus, the second and third heaters are demoted to the ranks lower by one rank than the former ranks, namely, the rank relationship of the second and third heaters is maintained.

Next, when the CPU 10 determines (in a3) that the first heater is requested to activate in a heater activation controlling cycle T2, the CPU determines (in b3) to activate the first heater in a third heater activation controlling cycle T3 according to the heater activation priority order (described in c2), and then changes the heater activation priority order to the order described in c3. In this case, the rank of the first heater, which is activated in the heater activation controlling cycle T3, is changed from the first rank to the third rank (lowest rank). The rank of the second heater is changed from the second rank to the first rank (highest rank), and the rank of the third heater is changed from the third rank to the second rank. Thus, the second and third heaters are promoted to the ranks higher by one rank than the former ranks, namely, the rank relationship of the second and third heaters is maintained.

Next, when the CPU 10 determines (in a4) that it is not necessary to activate the heaters in the heater activation controlling cycle T3, none of the heaters is activated in a fourth heater activation controlling cycle T4 as illustrated in column b4. In this case, the heater activation priority order is maintained (c4), namely, the first, second and third ranks are accorded to the second, third and first heaters.

As mentioned above, the heater activation priority order (second priority order), which is changeable in a heater activation controlling cycle depending on the usage conditions of the heaters, is additionally established on the heaters, on which the heater priority order (first priority order) is preliminarily established, and the ranks of the heaters are changed every heater activation controlling cycle T.

Similar operations are performed in the heater activation controlling cycles T5 to T11. Specifically, when plural heaters are requested to activate, one of the plural heaters having the highest rank in the heater activation priority order is activated. When only one heater is requested to activate, the requested heater is activated. In both of the cases, the rank of the activated heater is changed to the lowest rank. When no heater is requested to activate, none of the heaters is activated and the heater activation priority order is maintained.

Thus, the heater activation priority order (second priority order) is changed every heater activation controlling cycle T such that the lowest rank is accorded to the heater activated in the last heater activation controlling cycle, and the rank relationship of the other heaters, which are not activated in the last heater activation controlling cycle, is maintained.

In the example illustrated in FIG. 5, the heater activation priority order has three patterns, i.e., (1)→(2)→(3), (2)→(3)→(1), and (3)→(1)→(2). Namely, by preliminarily determining the heater priority order (first priority order) ((1)>(2)>(3)), the heater activation priority order (second priority order) does not have patterns such as (1)→(3)→(2), (2)→(1)→(3), and (3)→(2)→(1).

Next, an example of outputting a control signal from the CPU 10 on the basis of the detected temperatures will be explained.

Figure 6:
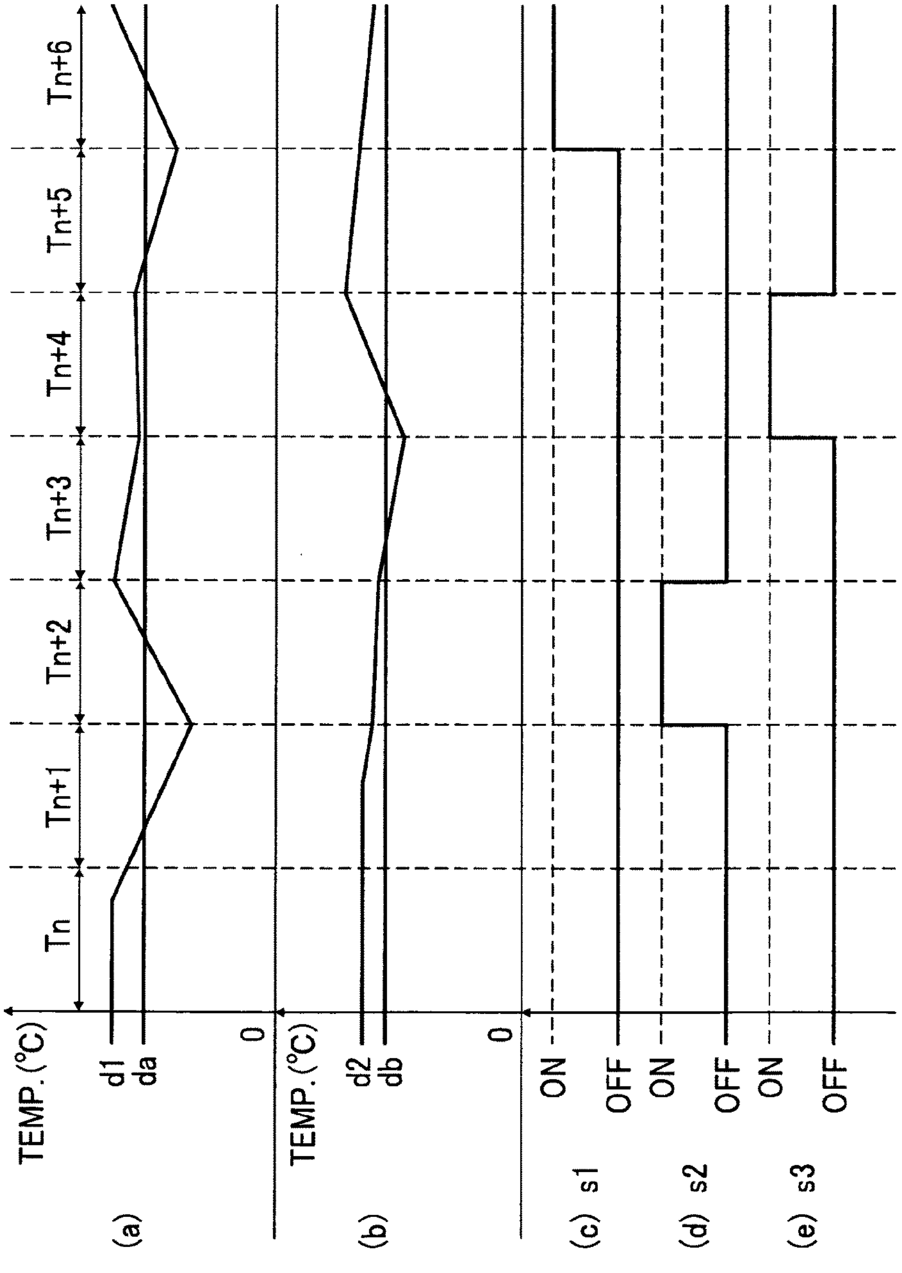
FIG. 6 is a schematic view for explaining how control signals for controlling heater activation are output by the CPU on the basis of detected temperatures.

FIG. 6 is a schematic view illustrating an example of control signals output from the CPU 10 on the basis of the detected temperatures.

FIG. 6(*a*) illustrates change of the first temperature d1 in each heater activation controlling cycle T (Tn, Tn+1, Tn+2, . . . , wherein n is a positive integer). Referring to FIG. 6(*a*), when it is detected that the first temperature d1 is much lower than a predetermined temperature da in a heater activation controlling cycle Tn+1, the CPU 10 judges that the first heater 30 and the second heater 31 are requested to activate. In this case, if the rank of the second heater 31 is higher than that of the first heater 30 in the heater activation priority order (second priority order), the CPU determines that the second heater is to be activated in the next heater activation controlling cycle Tn+2, and allows the second heater driving device 21 to produce the second ON/OFF signal s2 as illustrated in FIG. 6(*d*), resulting in activation of the second heater.

When it is detected that the second temperature d2 is much lower than a predetermined temperature db in a heater activation controlling cycle Tn+3, the CPU 10 judges that the third heater 32 is requested to activate. The CPU 10 determines that the third heater 32 is to be activated in the next heater activation controlling cycle Tn+4, and allows the third heater driving device 22 to produce the third ON/OFF signal s3 as illustrated in FIG. 6(*e*), resulting in activation of the third heater.

In addition, when it is detected that the first temperature d1 is much lower than the predetermined temperature da in a heater activation controlling cycle Tn+5, the CPU 10 judges that the first heater 30 and the second heater 31 are requested to activate. In this case, since the rank of the first heater 30 is higher than that of the second heater 31 in the heater activation priority order (because the second heater is activated in the heater activation controlling cycle Tn+2), the CPU 10 determines that the first heater 30 is to be activated in the next heater activation controlling cycle Tn+6, and allows the first heater driving device 20 to produce the first ON/OFF signal s1 as illustrated in FIG. 6(*c*), resulting in activation of the first heater.

In FIG. 6, no heater is activated in the heater activation controlling cycles Tn, Tn+1, Tn+3, and Tn+5, the heater activation priority order (second priority order) is not changed (i.e., the heater activation priority order is maintained in the next heater activation controlling cycle.

In the above example, change of the heater activation priority order is made in a heater activation controlling cycle after determining the heater to be activated in the next heater activation controlling cycle. However, it is possible to make the change of the heater activation priority order at the beginning of each heater activation controlling cycle, in which the CPU 10 has relatively light load. In this case, deterioration of performance of the image forming apparatus can be prevented.

In addition, since the heater activation priority order is maintained in the next heater activation controlling cycle when no heater is activated, the load on the CPU 10 can be reduced.

Further, when phase controlling is performed at the beginning of activation of each heater, harmonic current components caused by the phase controlling are not added because plural heaters are not activated at the same time, resulting in reduction of the harmonic current components.

Next, the timing at which the heater activation controlling operation is performed will be explained.

It is possible that the heater activation controlling operation is performed in a waiting time in which the number of requests for activating plural heaters is small, or the controlling operation is selectively performed depending on the operation mode.

Figure 7:
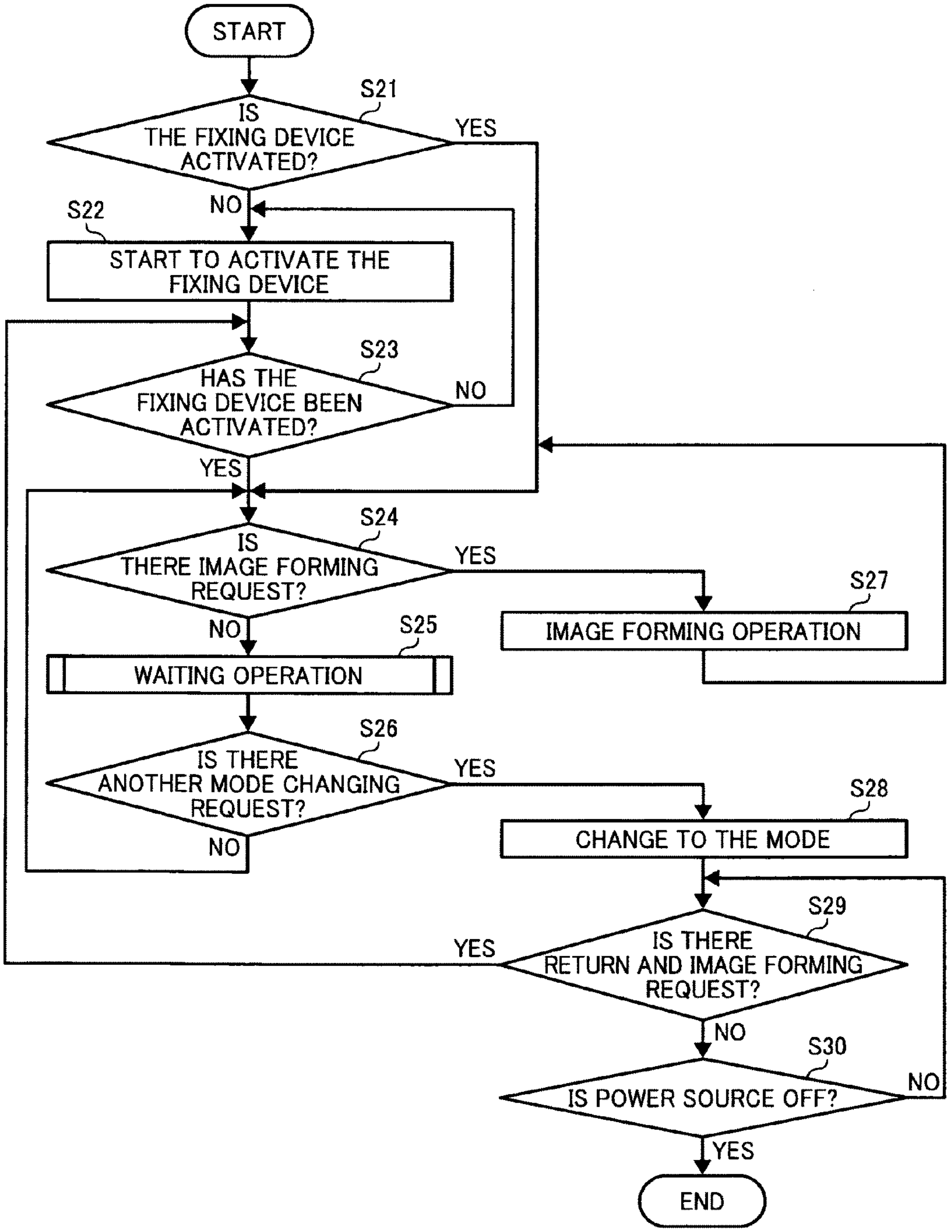
FIG. 7 is a flowchart illustrating the operations of the CPU of from power-on to power-off.

FIG. 7 is a flowchart illustrating the operation of the CPU 10 of from switch-on to switch-off.

After the image forming apparatus is switched on, the CPU 10 determines whether the temperature (d1, d2) of each of the rollers of the fixing device 35 is raised to the predetermined temperatures (da, db) (step S21). If the temperatures are not raised to the predetermined temperatures (NO in S21), the ordinary heater activation controlling (when it is desired to shorten the temperature rising time) or the above-mentioned heater activation controlling operation is performed to activate the heaters, i.e., to start up the fixing device 35 (step S22).

The CPU 10 judges whether the temperature of each of the rollers of the fixing device 35 is raised to the predetermined temperature in step S23. When it is determined that the temperature is raised to the predetermined temperature (YES in step S23), the CPU 10 determines whether there is an image forming request in step S24. When there is an image forming request (YES in step S24), the image forming operation is performed in step S27 and the operation returns to reexecute step S24.

When there is no image forming request (NO in step S24), the image forming apparatus is transferred to a waiting state (step S25). In the waiting time, the above-mentioned heater activation controlling is performed so that the fixing device can quickly operate upon receipt of an image forming request.

The CPU 10 judges whether there is a request for transferring the image forming apparatus to another mode (step S26). When there is no request (NO in step S26), the operation returns to reexecute step S24. When there is a request (YES in step S26), the image forming apparatus is transferred to the requested mode and the operation is performed at the mode (step S28). In addition, the CPU 10 judges whether there is a return and image forming request in step S29. When there is a request (YES in step S29), the operation returns to reexecute step S23. When there is no request (NO in step S29), the CPU 10 judges whether the power source is turned off (step S30). When the power source is not off (NO in step S30), the operation returns to reexecute step S29. When the power source is off (YES in step S30), this operation is ended.

In this example of the image forming apparatus, when plural heaters are to be activated (particularly when the heaters are subjected to phase controlling), only one heater is activated in a predetermined period (i.e., a heater activation controlling cycle), and thereby formation of strong harmonic current and great variation of voltage can be prevented.

In addition, controlling such that priorities are chosen for plural heaters and one of the plural heaters is exclusively activated is performed, and thereby great variation of voltage, flow of large current and formation of strong harmonic current (when phase controlling is performed) can be prevented. Although the heater activation priority order is determined and only one heater is activated in a heater activation controlling cycle according to the heater activation priority order, the waiting time can be controlled so as to fall within a predetermined time even when plural heaters are requested to activate.

Further, the plural heaters can be activated relatively evenly, and thereby occurrence of a problem in that the lives of one or more of the heaters are shortened can be prevented.

Furthermore, since the rank relationship between the plural heaters (i.e., the heater priority order (first priority order)) is maintained, each of the heaters is surely activated with a certain probability even when there is a heater which receives an activation request more frequently than the other heaters. For example, when the first to third heaters are requested every control cycle, at first the first heater is activated, the second heater is heated in the next control cycle, and the third heater is activated in the third control cycle. Thus, three heaters are surely activated. In addition, since the heater priority order is preliminarily determined, the program manipulation can be simplified.

Furthermore, when there is no request for activating a heater, the heater activation priority order is not changed, and thereby the program manipulation is not performed, resulting in simplification of the program manipulation and reduction of load on the program manipulation.

Furthermore, by performing the controlling operation in a time of a control cycle in which a relatively light load is applied on the program manipulation, the program manipulation can be simplified and load thereon can be reduced.

Furthermore, the controlling operation is not performed in the start-up time of the image forming apparatus or a copying/printing time, in which plural heaters are activated, and is performed in a waiting time in which a relatively small number of operations are performed, resulting in reduction of load on the program manipulation without deteriorating the function of the image forming apparatus.

Next, another example of the heating device of the present invention will be explained.

Figure 8:
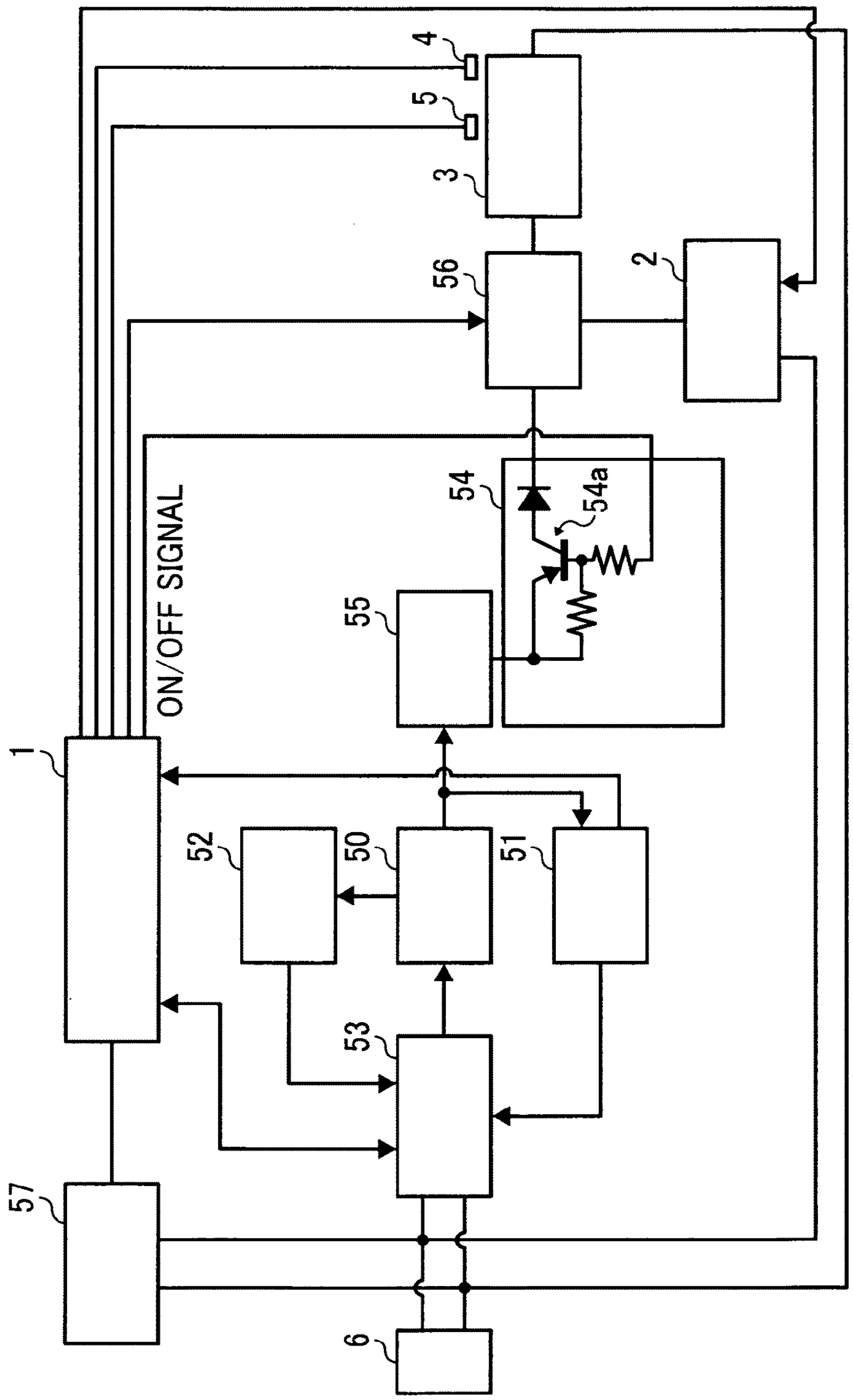
FIG. 8 is a functional block diagram illustrating another example of the heating device of the present invention.

FIG. 8 is a functional block diagram illustrating another example of the heating device for use in the fixing device of the image forming apparatus illustrated in FIG. 2.

In this example, an electric power stored in a condenser is applied to the heaters 30-32 of the heater 3. The heater activation controlling operation mentioned above is also performed on this heating device.

This image forming apparatus includes not only the above-mentioned controller 1, heater driving device 2, heater 3, first temperature detection sensor 4, second temperature detection sensor 5 and power source 6, but also an electric storage device 50, a charging voltage detector 51, a charging current detector 52, a charge controller 53, a storage power supplying device 54, a constant voltage generator 55, a switch 56, and an AC/DC converter 57.

The electric storage device 50 is a device including a condenser such as lithium ion condensers and electric double layer condensers. For example, a device (so-called capacitor bank) in which electric double layer condensers are serially connected is used therefor.

Although the structure of the electric storage device 50 is not illustrated, the device 50 includes an equalization circuit including a bypass circuit configured to bypass charging when each of the cells of the electric double layer condensers is fully charged; a first signal generation circuit configured to generate a single-cell full-charge signal when one of the cells of the electric double layer condensers is fully charged; and a second signal generation circuit configured to generate an all-cell full-charge signal when all of the cells of the electric double layer condensers are fully charged.

The electric storage device 50 has such a cell configuration as to have a capacity to supply a power to the first to third heaters 30-32.

The charging voltage detector 51 includes a dividing network constituted of resistors, and detects the terminal voltage of the electric storage device 50, and outputs the terminal voltage data to the charge controller 53.

The charging current detector 52 detects the current flowing a resistor serially connected with the electric storage device 50 by measuring the terminal voltage of the resistor, and outputs the current data to the charge controller 53.

The charge controller 53 includes a circuit (not shown) configured to generate a voltage for charging the electric storage device 50 using a power input from the power source 6 to the charge controller 53; and an output voltage controlling circuit (not shown) configured to control the output voltage.

The charge controller 53 detects the data output from the charging voltage detector 51 and the charging current detector 52, and performs constant current charging, constant power charging or constant voltage charging on the electric storage device 50 on the basis of the output data using the power supplied from the power source 6.

The storage power supplying device 54 includes a transistor 54*a* configured to supply an electric power to the switch 56 to charge the electric storage device 50 or interrupt the power according to the ON/OFF signal sent from the controller 1.

The AC/DC converter 57 converts an AC to a DC while stabilizing the DC to send the DC to various parts of the image forming apparatus.

Next, the charging operation of the charge controller 53 will be explained.

The charge controller 53 detects the terminal voltage of the electric storage device 50 on the basis of the voltage data output from the charging voltage detector 51. When the terminal voltage is lower than a predetermined voltage, the charge controller 53 successively checks the terminal voltage of the electric storage device 50 while performing a predetermined constant current charging operation on the electric storage device depending on the detected voltage. When the terminal voltage becomes not lower than the predetermined voltage, the charge controller 53 performs a predetermined constant power charging operation on the electric storage device 50. In this regard, the charge controller 53 successively detects the charging current and the terminal voltage of the electric storage device 50 to perform the constant power charging operation on the electric storage device 50 depending on the detected current and voltage.

Further, when the charge controller 53 detects a single-cell full-charge signal, which indicates that any one of the cells of the electric storage device 50 is fully charged and which is output from the equalizing circuit (not shown), the charge controller 53 performs again the predetermined constant current charging operation on the electric storage device 50. When the charge controller 53 detects an all-cell full-charge signal, the charge controller 53 continues a constant voltage charging operation for a certain period of time, followed by interruption of the charging operation.

The charging operation for the electric storage device 50 is preferably performed when the image forming apparatus has a power enough to perform the charging operation (for example, at a time in which an image forming operation is not performed). In this case, it is preferable that the controller 1 outputs a charging instruction signal to the charge controller 53.

Next, the power supplying operation of the electric storage device 50 to the heater 3 will be explained.

When the heater to be activated is determined by the above-mentioned heater activation controlling operation, a power is applied by the electric storage device 50 to heat the heater. Specifically, a power output from the electric storage device 50 is input to the constant voltage generator 55 so as to have a constant voltage. The constant voltage power is then input to the emitter of the transistor 54*a* of the storage power supplying device 54. The transistor 54*a* supplies the power thus input to the emitter to the switch 56 when receiving an ON signal from the controller 1. Upon receipt of a switching signal from the controller 1, the switch 56 supplies the power, which is supplied by the storage power supplying device 54, to the heater 3. Thus, the heating device of the image forming apparatus can be controlled without causing serious variation of the supply voltage and strong harmonic current.

In addition, since the image forming apparatus has the electric storage device 50, the heating device can fully heat the fixing members without causing strong harmonic current even when it is necessary for the heating device to supply a large amount of heat, because a power can be supplied from the electric storage device.

Further, by using an electric double layer condenser for the electric storage device, good versatility can be imparted to the image forming apparatus.

The fixing device 35 illustrated in FIG. 2 uses a fixing belt. However, the present invention can also be applied to fixing devices using a fixing roller instead of the fixing belt. In addition, the number of heaters used for the rollers 41 and 42 is not particularly limited. For example, the present invention can be used for cases where three or more heaters are provided in the heat roller 41 and/or two or more heaters are provided in the pressure roller 42. Further, the present invention can be used for cases where one or more additional heaters are used for heating other members of the fixing device. In addition, arrangement of heaters is not limited to that illustrated in FIG. 2.

Further, the number of temperature detection sensors is not particularly limited, and three or more sensors can be used for detecting temperatures of heating members to precisely perform the heater activation controlling operation on the basis of the detected temperatures.

In addition, a relay switch can be provided in the heater driving device for switching between supply and interruption of power to be supplied from the first to third heater driving devices to the first to third heaters. In this case, power supply from the first to third heater driving devices to the first to third heaters and interruption thereof are controlled according to the switching signal output from the CPU.

Further, a photo coupler (photo triac) can be used for the heater driving device 2. In this regard, photo triacs such that when the photo coupler achieves an ON state, the triac achieves an ON state are preferably used.

Furthermore, the following method can be used for the above-mentioned heater activation controlling operation. Specifically, the zero cross point of the power of the power source 6 is detected to be informed to the CPU 10. The CPU 10 supplies power to the first to third heaters 30-32 or interrupts the power according to the zero cross point information.

The heating device, heating method and image forming apparatus of the present invention can be preferably used for image forming apparatuses such as copiers, printers, facsimiles, and multifunctional image forming apparatus having multi-functions such as copier, printer and facsimile functions.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2009-064554, filed on Mar. 17, 2009, the entire contents of which are herein incorporated by reference.

What is claimed is:

1. A heating device comprising:

plural heat sources configured to heat one or more members;

a power supplying device configured to supply a power to each of the plural heat sources; and a controller configured to determine a fixed first priority order for the plural heat sources while determining a second priority order for the plural heat sources in every control cycle based on the fixed first priority order and to control the power supplying device to supply a power to one of the plural heat sources according to the second priority order, wherein:

when the controller judges to activate only one of the plural heat sources in a control cycle, the controller allows the power supplying device to supply a power to one of the plural heat sources in the control cycle, when the controller judges to activate two or more of the plural heat sources in a control cycle, the controller allows the power supplying device to supply a power to one of the plural heat sources, which has a highest rank in the second priority order among the two or more of the plural heat sources, in the control cycle, and the controller changes the second priority order by according a lowest rank to one of the heat sources activated in a last control cycle while maintaining rank relationship among the others of the plural heat sources in the second priority order in the last control cycle.

2. The heating device according to claim 1, wherein when the controller judges not to activate one or more of the plural heat sources in a heater activation control cycle, the controller maintains the second priority order in the last control cycle.

3. The heating device according to claim 1, wherein the controller determines the second priority order for a control cycle in a last heater activation control cycle.

4. The heating device according to claim 1, wherein the power supplying device includes an electric storage device, and supplies a power stored in the electric storage device to each of the plural heat sources.

5. The heating device according to claim 1, further comprising:

plural sensors configured to detect temperatures of the one or more members, wherein the controller makes judgment as to whether to activate one or more of the plural heat sources according to the detected temperatures.

6. The heating device according to claim 5, wherein the one or more members are one or more fixing members configured to fix a toner image on a recording medium.

7. An image forming apparatus comprising:

an image forming section configured to form a toner image on a recording medium; and a fixing device having one or more fixing members configured to fix the toner image on the recording medium, wherein the one or more fixing members are heated by the heating device according to claim 1.

8. A method for supplying power to plural heat sources to heat one or more members, comprising:

determining a second priority order for the plural heat sources in every control cycle based on a fixed first priority order;

judging whether to activate one or more of the plural heat sources in a control cycle based on conditions of the one or more members;

when it is judged to activate only one of the plural heat sources, supplying a power to one of the plural heat sources in the control cycle;

when it is judged to activate two or more of the plural heat sources, supplying a power to one of the plural heat sources having a highest rank in the second priority order among the two or more of the plural heat sources in the control cycle; and changing the second priority order by according a lowest rank to one of the heat sources activated in a last control cycle while maintaining rank relationship among the others of the plural heat sources in the second priority order in the last control cycle.

9. The method according to claim 8, further comprising:

detecting temperatures of the one or more members, wherein the judging is made according to the detected temperatures.

* * * * *